July 26, 1932.  L. SIRCOULOMB  1,869,225
MACHINE FOR STRAIGHTENING MACHINE PARTS
Filed Nov. 3, 1930  4 Sheets-Sheet 1
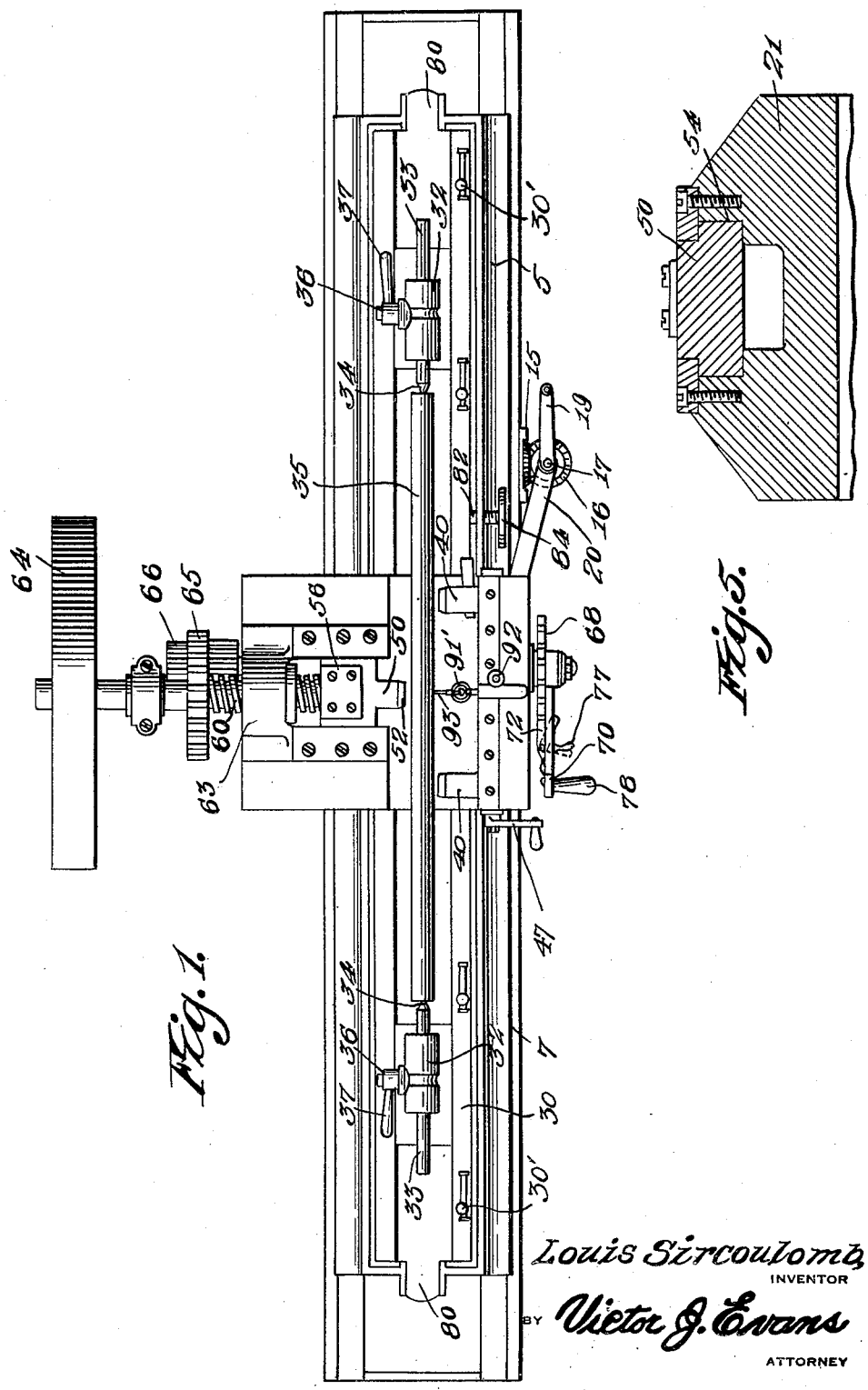
Louis Sircoulomb
INVENTOR
BY Victor J. Evans
ATTORNEY

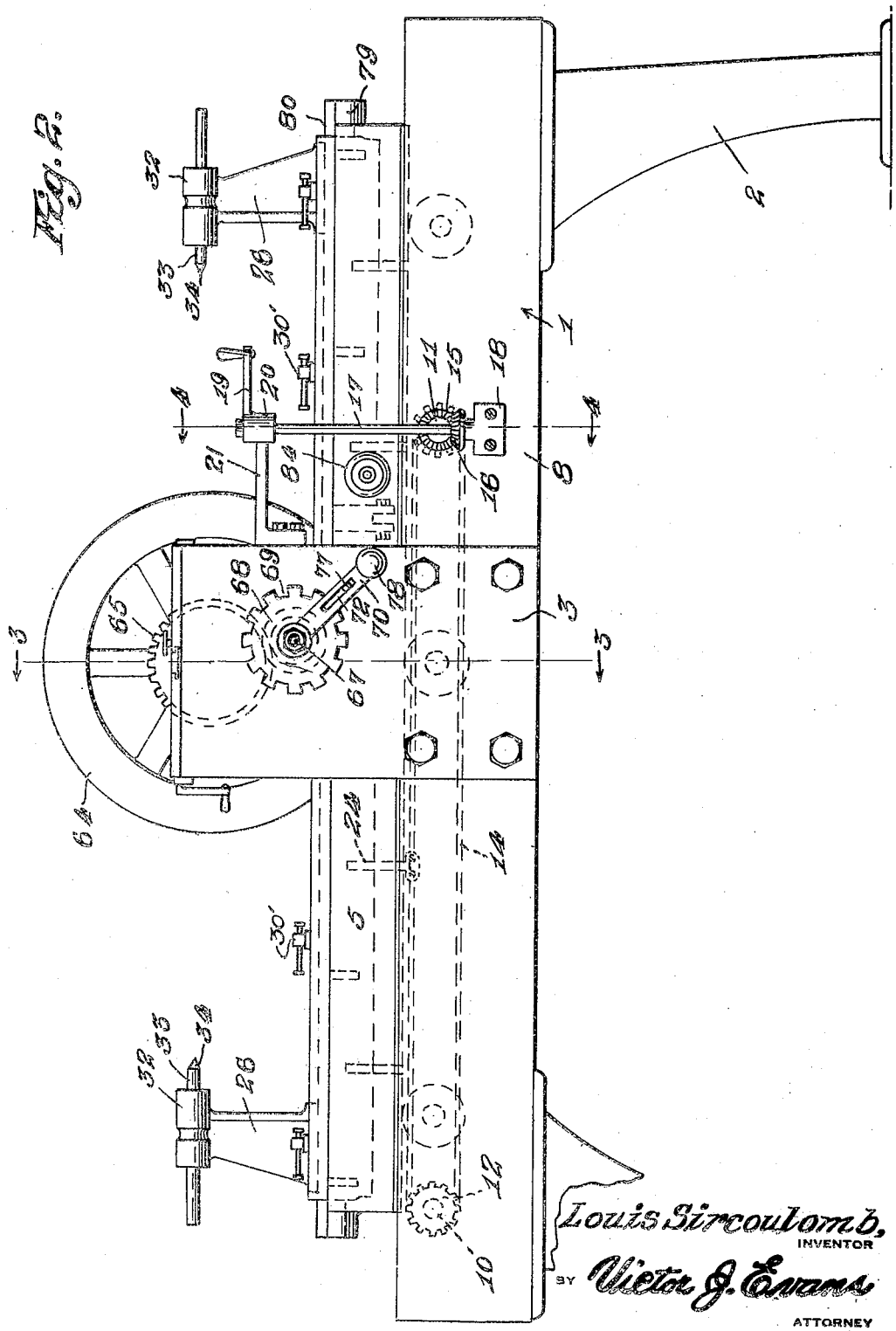

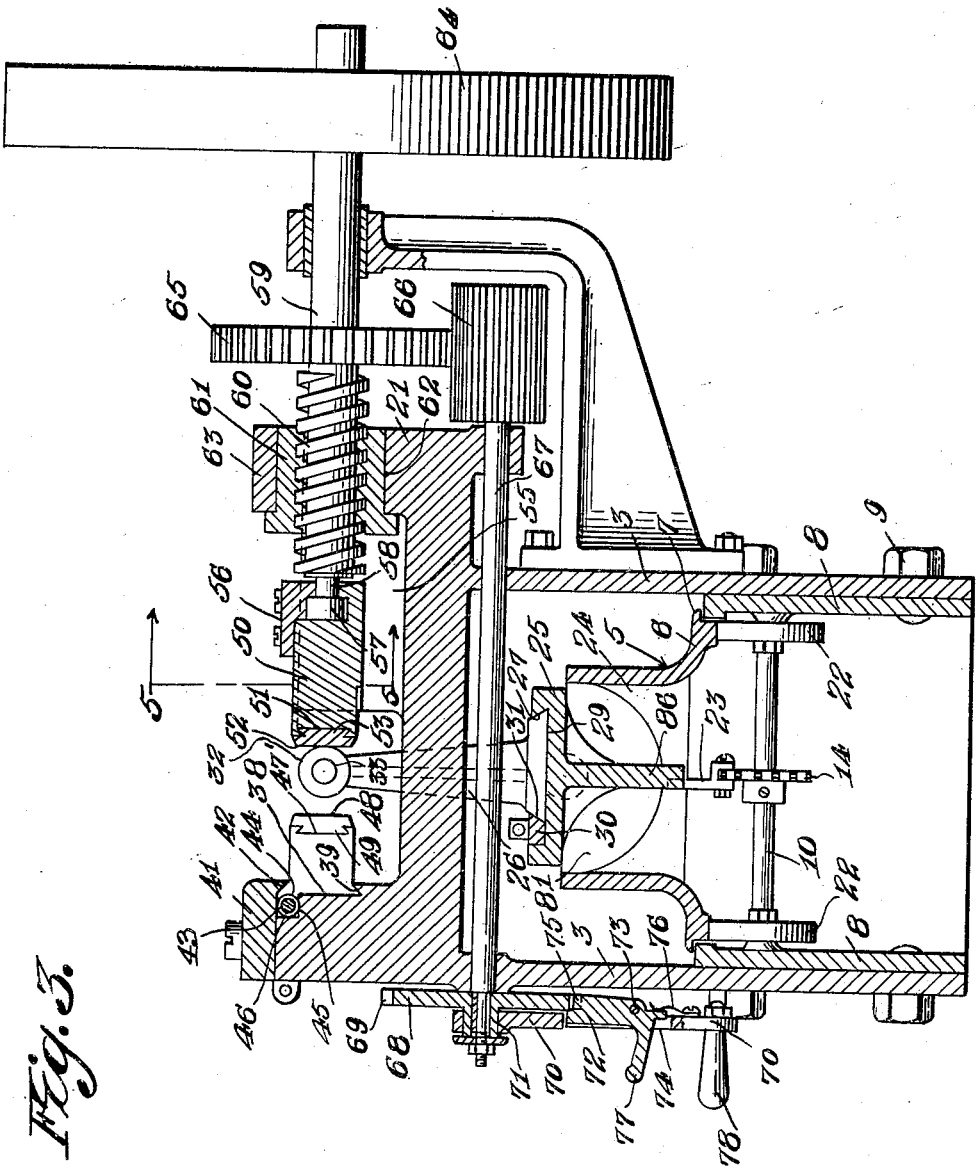

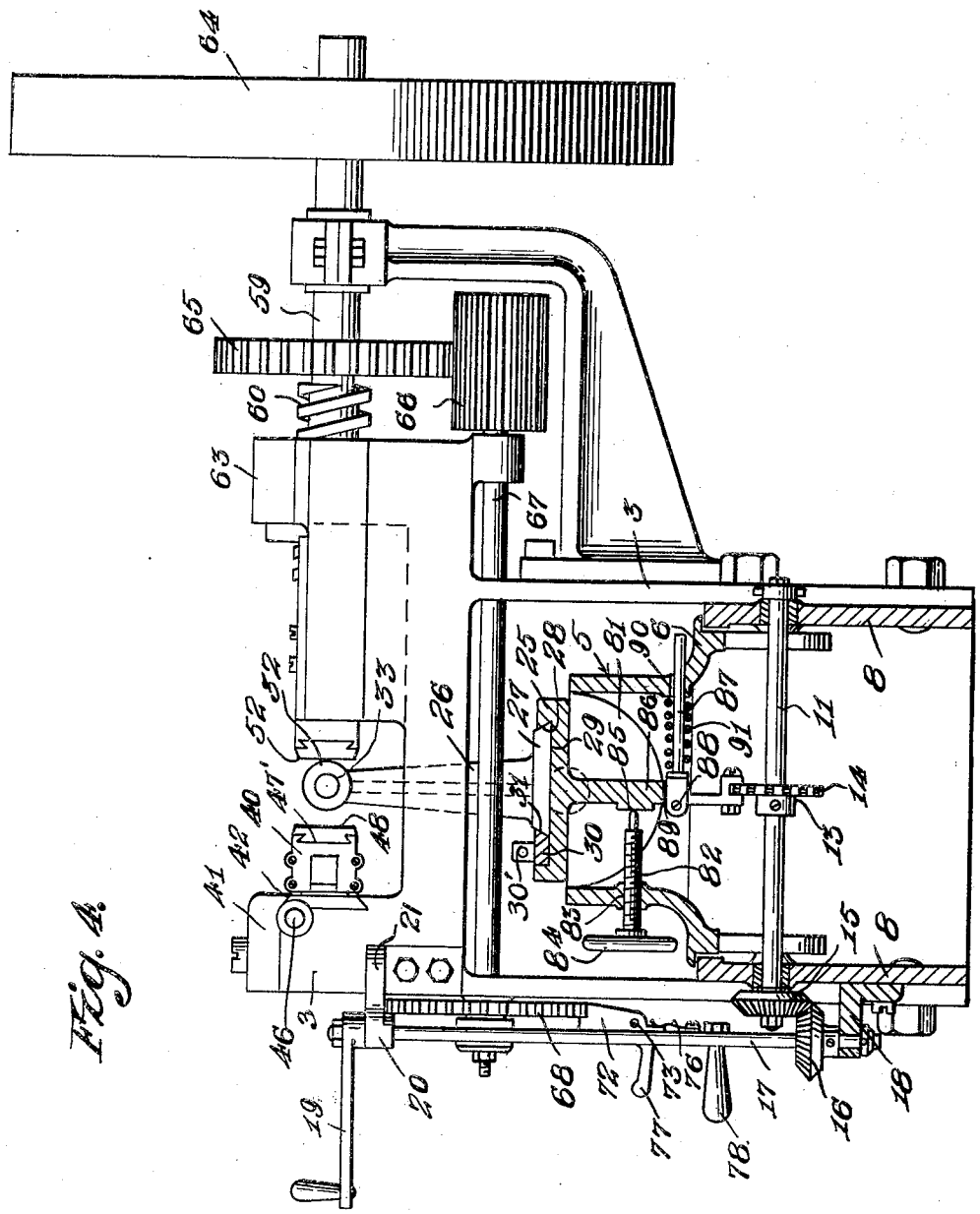

Patented July 26, 1932

1,869,225

UNITED STATES PATENT OFFICE

LOUIS SIRCOULOMB, OF TORRINGTON, CONNECTICUT

MACHINE FOR STRAIGHTENING MACHINE PARTS

Application filed November 3, 1930. Serial No. 493,147.

This invention relates to a machine for use in straightening parts of machines such for example as shafts, spindles, feed screws, axles, and the like, and the invention has as its primary object to provide a machine by the use of which machine parts of the general character above stated may be readily and accurately restored to a true straight form after they have become bent from collision or other causes.

Another object of the invention is to provide, in a machine of the class stated above, novel means for accurately supporting the part to be straightened by the utilization of supporting members engageable with the part at the ends of its axis and in direct alignment therewith.

Another object of the invention is to provide a machine of the class set forth above which may be employed in the straightening of shafts or other machine parts having one or even a comparatively large number of bends therein, the supporting and centering means for the part to be straightened, referred to above, being adjustable with respect to the means provided for effecting straightening, whereby any portion of the length of the part to be straightened may be acted upon by the straightening means.

Another object of the invention is to so construct the straightening means of the machine of the invention that shafts or similar machine parts having different portions of their lengths of different diameters, may be straightened.

Another object of the invention is to so construct the means provided for supporting and centering the part to be straightened, for the purpose of adjusting the part to bring one or more points in its length into position to be acted upon by the straightening devices of the machine, that it will be unnecessary to dismount the part in order to effect such adjustment of the supporting and centering means, so that when the part to be straightened has been accurately centered, it will retain this position regardless of adjustments of any part of the machine.

This invention also consists in certain other features of construction and in the combination and arrangement of the several parts, to be hereinafter fully described, illustrated in the accompanying drawings, and specifically pointed out in the appended claims, it being understood of course that minor changes may be made so long as they fall within the scope of the claims.

In describing my invention in detail, reference will be had to the accompanying drawings, wherein like characters denote like or corresponding parts throughout the several views, and in which:

Figure 1 is a top plan view of the machine embodying the invention.

Figure 2 is a view in front elevation of the machine.

Figure 3 is a vertical front to rear sectional view taken substantially on the line 3—3 of Figure 2, looking in the direction indicated by the arrows.

Figure 4 is a similar view on the line 4—4 of Figure 2, looking in the direction indicated by the arrows.

Figure 5 is a sectional view taken substantially on the line 5—5 of Figure 3, looking in the direction indicated by the arrows.

The machine comprises a bed 1 which is supported, at its four corners by legs 2 and uprights 3 are mounted upon the bed at the front and rear thereof. Mounted between the sides of the bed for longitudinal adjustment is a slide which is indicated in general by the numeral 5 and this slide is preferably in the nature of a cast body and includes a base portion 6 having marginal longitudinal flanges 7 which rest slidably upon the upper edges of plates 8 which are secured by bolts 9 to the sides of the bed. Shafts 10 and 11 are journalled at their ends in bearings upon the inner sides of the plates 8 and sprocket gears 12 and 13 are mounted upon the rear ends of the shafts 10 and 11 respectively, and a sprocket chain 14 is trained about these gears.

A bevel gear 15 is fixed upon the forward end of the shaft 11 and meshes with a bevel gear 16 fixed upon the lower end portion of a shaft 17, the lower end of which shaft is journalled in a step bearing 18 upon the front one of the plates 8. A crank handle 19 is fixed upon the upper end of this shaft, which end of the shaft is journalled in a bearing 20 mounted upon a bracket 21 which is attached to one upright 3 and, at this point, it will be understood that by rotating the shaft 17 through the medium of the crank handle 19 rotary motion will be imparted to the shafts 10 and 11, and the sprocket chain 14 will be caused to travel about the sprocket gears 12 and 13 upon these shafts. In order to insure even adjustment of the slide 5, longitudinally with respect to the bed of the machine, anti-friction rollers 22 are mounted upon stub shafts and the lower marginal portions of the sides 6 of the slide 5 are arranged so as to rest upon these rollers. In order that travel of the chain may effect sliding longitudinal adjustment of the slide 5, one of the links of the chain has mounted upon it an upstanding arm 23 and the upper end of this arm is positioned to coact with the slide 5 to impart longitudinal sliding movement to the slide when motion is imparted to the chain.

The sides of the slide 5 are connected at their forward and rearward portions by cross pieces 24. A base member 25 is mounted at the top of the slide 5 and it is upon this base that the supporting and centering means for the work to be straightened, as above referred to, is mounted.

The supporting and centering means comprises two heads 26, each including a base portion 27 which preferably has its forward and rear edges bevelled as indicated by the numeral 28 and the base portions 25 of the slide are formed with seating recesses 29 each having an inclined side wall and it is within these recesses that the bases 27 of the respective heads 26 are seated, one bevelled edge 28 of the base 27 of each head engaging the bevelled side wall of the recess 29 of the respective base member 25, and a clamping member 30 being arranged within each recess 29 and having a straight edge engaging against the other side wall of the respective recess 29 and said member having its other edge bevelled as indicated by the numeral 31 to engage the other bevelled edge 28 of the base 27 of the respective head 26, and in this manner the heads 26 are held in place upon the base members 25. Clamping screws 30' hold the clamping member down upon the base members. Each head 26 is provided at its upper end with a cylindrical enlargement 32 and this enlargement has an axial bore in which there is mounted a supporting and centering rod 33 having a pointed end 34 designed to engage with the adjacent end of the part to be straightened, which part, in Figure 1 of the drawings is indicated by the numeral 35, the tapered point 34 entering the respective end of the said member a sufficient distance. The centering rods 33 are of course slidably adjustably fitted in the bores of the enlargement 32 of the respective heads 26, and a bolt 36 is threaded through an opening in one side of each enlargement 32 and is provided with a handle 37 whereby it may be rotated to cause it to bind against the respective one of the rods 33 and in this manner the rods are held in their different positions of sliding adjustment and, by providing, in connection with each machine, rods of this character of different lengths or a pair of rods of sufficient length, the pointed ends 34 of the centering rods may be brought into engagement with the ends of pieces, to be straightened, of different lengths. The slide 5 is movable along the machine bed by means of the sprocket chain 14 and its driving parts, the flanges 6 of the slide moving along on the rollers 22 and the top edges of the plates 8—8. Each of the heads 26 is adjustable along the slide by virtue of the parts 27, 28, 29, 30 and 31, and the heads 26 may tilt with the bases 25 as will hereinafter appear.

The forward one of the heads 21' is formed in its rear side with a recess 38 and the lower wall of this recess is bevelled as at 39, and presser heads 40, of which there are a pair, are disposed at their base portions in the recess and are flared at their side portions so as to engage, at their lower sides, with the bevelled wall 39 of the recess. A cap member 41 is removably secured upon the top of the head member and has a depending bevelled flange 42 at its rear side which engages the bevelled or flared parts of the heads 40 at their upper sides, and at their said sides, each of the heads 40 is provided with a boss 43 which is formed with worm threads 44 and which projects slidably into a rectangular groove 45 extending at the upper side of the recess 38. A worm shaft 46 is rotatably mounted in the groove 45 and is provided with right and left hand threads so that, upon rotation of the shaft in one direction, through the medium of a crank handle 47 which is fitted upon one end thereof, the heads 40 will be slidably adjusted in the recess 38 toward each other and, upon rotation of the worm shaft in the opposite direction, the heads will be moved apart. Each head is formed in its rear side with a recess 47' having bevelled walls and a work engaging member 48 is provided with a dovetail boss 49 upon its inner side and the outer sides of the members 48 may be of such contour as to adapt each member to engage snugly against and conform to the contour of the part to be straightened, it being understood that the presser heads will be so relatively adjusted as to engage one side of said part to be straightened at opposite sides of the bend therein.

The straightening means of the invention further includes a presser head 50 which is mounted, in a manner which will now be described, opposite or at a point midway between the presser heads 40 and this head is also formed, at its inner side, with a dovetail recess 51, corresponding to the recess 47′ in each of the heads 40, and a work engaging member 52 corresponding to the work engaging members 48 has its dovetail boss 53 seated in this recess. The head 50 is mounted in a recess 54, Fig. 5, formed in the upper side of inward extensions 55 at the inner side of the other one of the heads 21′. A cap member 56 is removably mounted upon the upper side of the head 50 and this member and the head are formed to accommodate a circular head 57 formed at the forward end of the reduced portion 58 of a shaft 59. The shaft 59 has a threaded portion 60 and this portion is fitted in a bushing 61 mounted in a recess 62 formed in the respective head 21′ and secured in place by a cap member 63 which is removably held upon the upper side of the said head 21′. At this point it will be evident and particularly by reference to Figure 3 of the drawings that the reduced end of the shaft 59 is swivelled in the presser member 50. A fly wheel 64 is fixed upon the rear end of the shaft 59 and a gear 65 is likewise fixed upon the said shaft and meshes with a pinion 66 which is of a width considerably greater than the gear 65 so as to provide for continuous meshing of the gears regardless of longitudinal adjustment or feeding of the shaft 59. The pinion 66 is mounted upon a shaft 67 which is mounted in the uprights 3 and fixed upon the forward end of this shaft is a wheel 68 provided in its periphery with notches 69 and a crank handle 70 is swingingly mounted upon the hub 71 which extends from the forward side of the wheel 68 and a pawl 72 is pivotally mounted as at 73 in a slot 74 formed in the handle 70 and a tooth 75 at one end of the pawl is engageable in the notches 69, selectively. The pawl 72 is yieldably held in position with its tooth 75 engaging in the notches 69 by means of a leaf spring 76 which is mounted upon the handle and bears against the pawl at that side of the pivot 73 opposite the side at which the tooth is located. A thumb piece 77 extends from the pawl adjacent the pivot 73 and is located in juxtaposition to a hand grip 78 which is provided at the outer end of the crank handle 70 and may be engaged by the thumb of the attendant at the machine for the purpose of disengaging the tooth of the pawl from the notches 69 and rotating the crank handle to a new position of adjustment with respect to the wheel 68.

The base 25 is preferably supported for forward and rearward tilting movement so as to provide for a backward and forward adjustment of the heads 26, and the piece of work, to be straightened, which is mounted between these heads, and with this end in view, the slide 5 is formed at its ends with bearings 79 which are of substantially semi-cylindrical form and open at their rear sides, and the base 25 is, in turn, formed at its ends with trunnions 80 which seat in these bearings, semi-circular heads 81 being provided upon the under side of the base 25 with their arcuate margins engaging the inner surfaces of the sides of the slide 5 so as to steady the base in its positions of tilting adjustment.

In order that the said base may be tiltably adjusted, an adjusting screw 82 is threaded through an opening 83 formed in the forward side member of the slide 5 and a hand wheel 84 is mounted upon the outer end of this screw, and the inner end of the screw is reduced in diameter to provide a bearing stud 85 which constitutes an abutment for the depending flange 86 formed upon the under side of the base 25. The spring 87 acts normally to hold the centers 33 in position to prevent the work from contacting with blocks 40, and the said spring yields to allow such contact when the block 50 forces the work toward the blocks 40. In order that the base 25 may be held steady, as stated above, and also in order that the flange 86 may be held in engagement with the abutment stud 85, a stem 87 is pivotally mounted as at 88 in a recess 89 formed in the lower end of the flange 86 and extends slidably through an opening 90 formed in the rear side member of the slide 5, a compression spring 91 being arranged upon the stem and yieldably urging the same in a forward direction so as to maintain the flange 86 in engagement with the adjusting screw.

Mounted upon the top of the front head 21′ is an indicator 91′ and this indicator is adapted to be adjusted by any suitable means as for example a finger knob 92 so that the point 93, which constitutes a part of the indicator, may be brought into engagement, at its free end, against the piece of work to be straightened, in order to make certain, by reference to the scale of the indicator, that the work has been properly straightened.

The point 93 is moved by turning the knob 92 so that the point may be used as means to ascertain if the shaft has been properly straightened. During the operation of straightening the shaft, the knob 92 is turned so that the point 93 is moved out of the way.

What I claim is:

1. In a machine of the class described, a base having uprights, a slide longitudinally adjustable upon the base, relatively spaced work supporting and centering units mounted upon the slide, pressure-exerting heads mounted upon the uprights of the base in position to engage opposite sides of a part to be straightened, the heads engageable with one side of the said part being in staggered relation to a head engageable with the other side of the work, means for moving a head into and out of position to exert pressure against the work, the said means comprising a rotatable shaft, manually operable means for rotating the shaft, a relatively long gear upon the shaft, a shaft mounted parallel to the first mentioned shaft and movable longitudinally, the second mentioned shaft having a worm thereon, a bearing member upon the base having threads meshing with the worm upon the second mentioned shaft, a gear upon the second mentioned shaft meshing with the relatively long gear upon the first mentioned shaft in all positions of longitudinal adjustment of the second mentioned shaft, and operative connection between the said second mentioned shaft and the last mentioned pressure-exerting head.

2. In a machine of the class described, a base having uprights, a slide longitudinally adjustable upon the base, relatively spaced work supporting and centering units mounted upon the slide, pressure-exerting heads mounted upon the uprights of the base in position to engage opposite sides of a part to be straightened, the heads engageable with one side of the said part being in staggered relation to a head engageable with the other side of the work, means for moving a head into and out of position to exert pressure against the work, the said means comprising a rotatable shaft, manually operable means for rotating the shaft, a relatively long gear upon the shaft, a shaft mounted parallel to the first mentioned shaft and movable longitudinally, the second mentioned shaft having a worm thereon, a bearing member upon the base having threads meshing with the worm upon the second mentioned shaft, a gear upon the second mentioned shaft meshing with the relatively long gear upon the first mentioned shaft in all positions of longitudinal adjustment of the second mentioned shaft, operative connection between the said second mentioned shaft and the last mentioned pressure-exerting head, another gear upon the first mentioned shaft, a handle upon said shaft, and a pawl upon the handle coacting with the teeth of the last mentioned gear to hold the said first mentioned shaft against rotation in different positions of adjustment of the last mentioned pressure-exerting head.

3. In a machine of the class described, a base having uprights, a slide longitudinally adjustable upon the base, relatively spaced work supporting and centering units mounted upon the slide, pressure-exerting heads mounted upon the uprights of the base in position to engage opposite sides of a part to be straightened, the heads engageable with one side of the said part being in staggered relation to a head engageable with the other side of the work, means for moving a head into and out of position to exert pressure against the work, and means operable to relatively adjust the heads located at one side of the machine, the said means comprising a worm shaft, manually operable means for rotating said worm shaft, the said shaft having right and left threads, the said pressure-exerting heads having threaded bosses and the threads of which bosses are in mesh with the respective threads of the worm shaft.

In testimony whereof I affix my signature.

LOUIS SIRCOULOMB.